United States Patent
Wang et al.

(10) Patent No.: US 11,482,895 B2
(45) Date of Patent: Oct. 25, 2022

(54) ELECTRIC MACHINE AND METHOD FOR MANUFACTURE

(71) Applicant: GM GLOBAL TECHNOLOGY OPERATIONS LLC, Detroit, MI (US)

(72) Inventors: Hongliang Wang, Sterling Heights, MI (US); Yew Sum Leong, Northville, MI (US); Song He, Troy, MI (US); Edward L. Kaiser, Orion, MI (US); John S. Agapiou, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 156 days.

(21) Appl. No.: 16/990,475

(22) Filed: Aug. 11, 2020

(65) Prior Publication Data
US 2022/0052569 A1   Feb. 17, 2022

(51) Int. Cl.
*H02K 1/18* (2006.01)
*H02K 15/02* (2006.01)
*H02K 15/14* (2006.01)
*H02K 5/24* (2006.01)

(52) U.S. Cl.
CPC ............. *H02K 1/18* (2013.01); *H02K 5/24* (2013.01); *H02K 15/02* (2013.01); *H02K 15/14* (2013.01)

(58) Field of Classification Search
CPC .......... H02K 15/22; H02K 15/02; H02K 1/16; H02K 5/24
USPC ............. 310/216.004–216.009, 256.1, 402, 310/216.011, 216.049
See application file for complete search history.

(56) References Cited

U.S. PATENT DOCUMENTS

| | | | |
|---|---|---|---|
| 10,680,472 B1 * | 6/2020 | Patruni | H02K 1/185 |
| 2009/0072655 A1 * | 3/2009 | Sano | H02K 1/185 |
| | | | 310/216.049 |
| 2011/0298331 A1 * | 12/2011 | Kaiser | H02K 1/185 |
| | | | 310/216.129 |
| 2013/0293060 A1 * | 11/2013 | Hasuo | H02K 1/12 |
| | | | 310/254.1 |

FOREIGN PATENT DOCUMENTS

WO   WO-0152385 A1 *   7/2001   ............. H02K 1/146

* cited by examiner

*Primary Examiner* — Jose A Gonzalez Quinones
(74) *Attorney, Agent, or Firm* — Cantor Colburn LLP

(57) ABSTRACT

An electric machine may include a substantially annular stator stack having a plurality of laminations which include mounting ears. A fraction of the laminations may be oriented such that the mounting ears are angularly offset from the others. The stator may be secured to a housing at both mounting ear locations thus improving structural rigidity and enhancing performance.

20 Claims, 6 Drawing Sheets

ELECTRIC MACHINE AND METHOD FOR MANUFACTURE

INTRODUCTION

Rotary electric machines are found in many industrial and product applications. Substantial torsional reactive forces may be transferred to a motor stator requiring the stator be adequately secured or mechanically grounded to prevent undesirable displacement and objectionable noise, vibration and harshness in certain applications.

SUMMARY

In one exemplary embodiment, an electric machine may include a substantially annular stator stack including a plurality of laminations, each lamination having a peripherally outer protuberance defining an aperture. The laminations may be in stacked adjacency with one another with a major fraction of adjacent laminations having respective apertures substantially aligned with one another to define a stator stack having a stator mounting boss, and with a first minor fraction of adjacent laminations having respective apertures substantially aligned with one another to define a first bracket stack having a first bracket mounting tab. The first bracket stack may be stacked at one end of the stator stack with the stator mounting boss and bracket mounting tab being angularly displaced from each other. The first bracket stack may include a total thickness of between about 1.0 mm and about 4.0 mm and between 3 and 20 laminations.

In addition to one or more of the features described herein, all laminations may be substantially identical.

In addition to one or more of the features described herein, laminations may be between about 0.2 mm and about 0.4 mm.

In addition to one or more of the features described herein, the major fraction of adjacent laminations may be welded to the first minor fraction of adjacent laminations.

In addition to one or more of the features described herein, the electric machine may include a machine housing, a first threaded fastener passing through the stator mounting boss for fastening the major fraction of adjacent laminations to the machine housing, and a second threaded fastener passing through the first bracket mounting tab for fastening the first minor fraction of adjacent laminations to the machine housing.

In addition to one or more of the features described herein, the electric machine may include a second minor fraction of adjacent laminations being stacked intermediate within the stator stack and having apertures substantially aligned with one another to define a second bracket stack having a second bracket mounting tab, the stator mounting boss and second bracket mounting tab being angularly displaced from each other with the first and second bracket mounting tabs being located on angularly opposite sides of the stator mounting boss.

In another exemplary embodiment, an electric machine may include a machine housing, and a substantially annular first stator stack including a first plurality of first laminations, each first lamination including a peripherally outer first mounting ear defining a first aperture, the first laminations in stacked adjacency with one another with the first apertures substantially aligned with one another to define a stator mounting boss. The electric machine may further include a substantially annular second stator stack including a second plurality of second laminations, each second lamination having a peripherally outer second mounting ear defining a second aperture, the second laminations in stacked adjacency with one another with the second apertures substantially aligned with one another to define a first bracket mounting tab. The second stator stack may include a total thickness of between about 1.0 mm and about 4.0 mm and between 3 and 20 laminations. The second stator stack in stacked may be in adjacency with the first stator stack with the stator mounting boss and bracket mounting tab angularly separated. The electric machine may include a first fastener passing through the stator mounting boss for fastening the first stator stack to the machine housing, and a second fastener passing through the first bracket mounting tab for fastening the second stator stack to the machine housing.

In addition to one or more of the features described herein, the first and second laminations may be substantially identical.

In addition to one or more of the features described herein, the second mounting ear of the second laminations may define a third aperture, the second laminations may be in stacked adjacency with one another with the third apertures substantially aligned with one another, and the second stator stack may be in stacked adjacency with the first stator stack with the third apertures substantially aligned with the first apertures.

In addition to one or more of the features described herein, the electric machine may further include a substantially annular third stator stack having a third plurality of the second laminations in stacked adjacency with one another with the second apertures substantially aligned with one another to define a second bracket mounting tab. The third stator stack may be in stacked adjacency with the second stator stack opposite the first stator stack with the third apertures of the third stator stack substantially aligned with the first apertures defining the first stack mounting boss, and with the second apertures of the second and third stator stacks on angularly opposite sides of the stator mounting boss.

In addition to one or more of the features described herein, the electric machine may further include a substantially annular third stator stack having a third plurality of the second laminations in stacked adjacency with one another with the second apertures substantially aligned with one another to define a second bracket mounting tab. The third stator stack may be stacked intermediate within the first stator stack with the third apertures of the third stator stack substantially aligned with the first apertures defining the first stack mounting boss, and with the second apertures of the second and third stator stacks on angularly opposite sides of the stator mounting boss.

In addition to one or more of the features described herein, the electric machine may further include a substantially annular third stator stack having a third plurality of the second laminations in stacked adjacency with one another with the second apertures substantially aligned with one another to define a second bracket mounting tab. The third stator stack may be in stacked adjacency with the second stator stack opposite the first stator stack with the second apertures of the second and third stator stacks on angularly opposite sides of the stator mounting boss.

In addition to one or more of the features described herein, all laminations may be between about 0.2 mm and about 0.4 mm.

In addition to one or more of the features described herein, the first stator stack may be welded to the second stator stack.

In yet another exemplary embodiment, a method for constructing an electric machine may include punching a plurality of laminations, each lamination including a peripherally outer protuberance defining a mounting aperture, stacking a first fraction of the plurality of laminations such that respective mounting apertures are substantially aligned with one another to define a stator mounting boss, and stacking a second fraction of the plurality of laminations such that respective mounting apertures are substantially aligned with one another to define a bracket mounting tab. The second fraction of laminations may include a total thickness of between about 1.0 mm and about 4.0 mm and between 3 and 20 laminations. The second fraction may be stacked at a top end of the first fraction to define a stator stack with the stator mounting boss and bracket mounting tab being angularly displaced from each other. A bottom end of the stator stack may be located to a locating surface of a machine housing and securing the stator stack to the machine housing with a fastener through the stator mounting boss, and the stator stack secured to the machine housing with a fastener through the bracket mounting tab.

In addition to one or more of the features described herein, the method may include welding the first fraction of stacked laminations to the second fraction of stacked laminations.

In addition to one or more of the features described herein, punching a plurality of laminations may include punching identical lamination for the first and second fractions.

In addition to one or more of the features described herein, punching a plurality of laminations may include punching a first lamination having a mounting ear with a single aperture for the first fraction of laminations, and punching a second lamination having a mounting ear with a pair of apertures for the second fraction of laminations, wherein punching the first and second laminations is accomplished with progressive station tooling.

In addition to one or more of the features described herein, punching a plurality of laminations may include punching a first lamination having a mounting ear with a single aperture for the first fraction of laminations, and punching a second lamination having a mounting ear with a pair of apertures for the second fraction of laminations, wherein punching the first and second laminations is accomplished with selectively actuated punch tooling The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
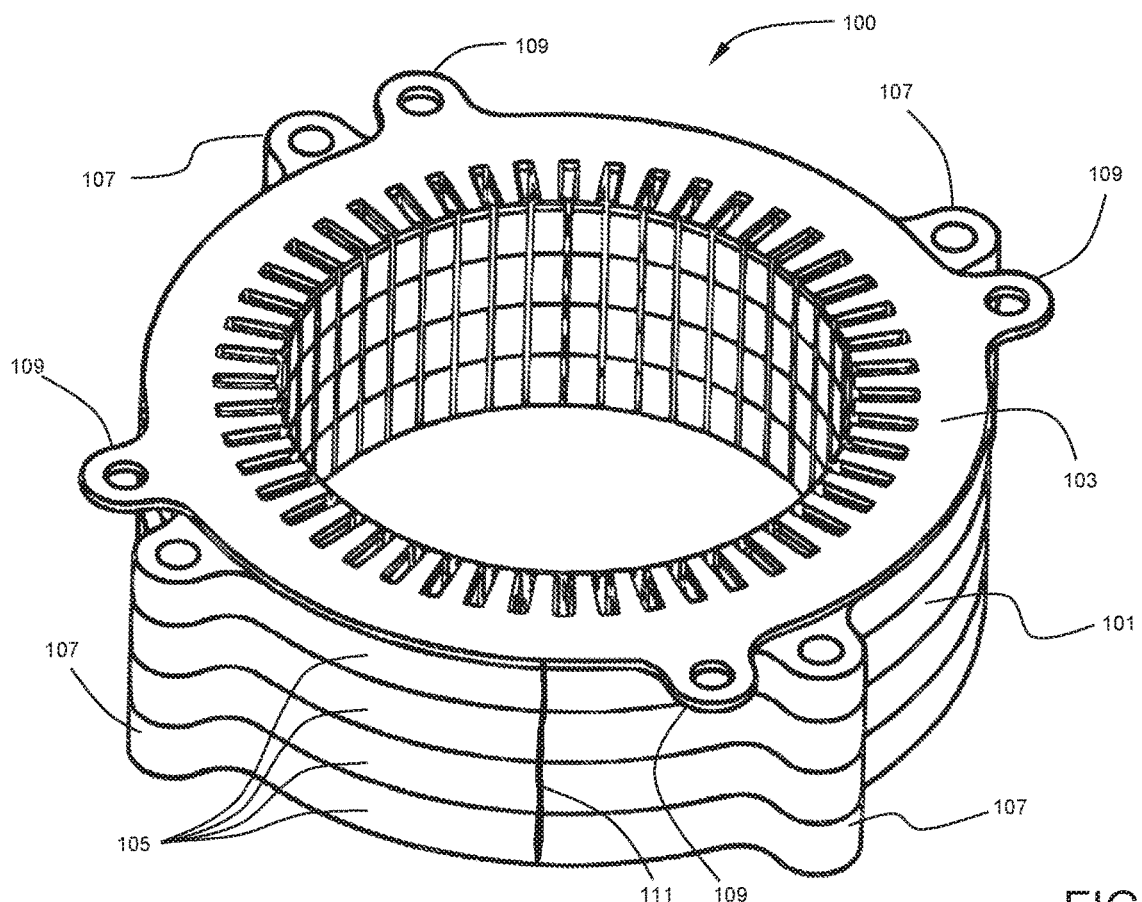
FIG. 1 illustrates an embodiment of a stacked lamination stator of an electric machine, in accordance with the present disclosure.

The following description is merely exemplary in nature and is not intended to limit the present disclosure, its application or uses. Throughout the drawings, corresponding reference numerals indicate like or corresponding parts and features.

Figure 2:
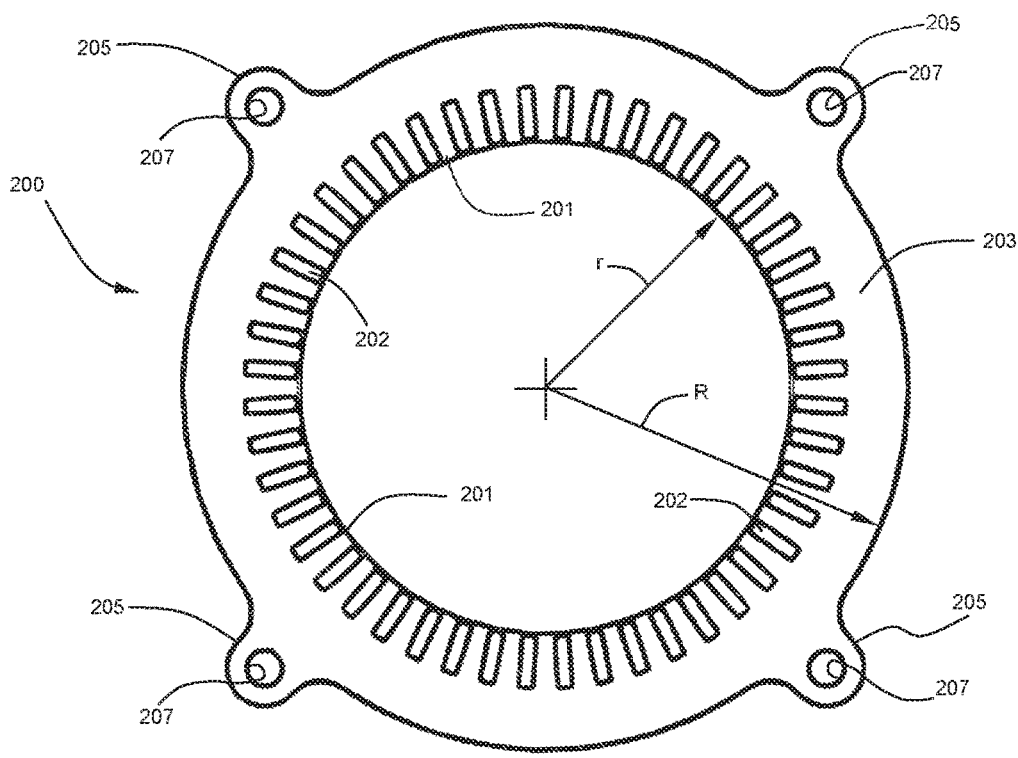
FIG. 2 illustrates a plan view of an embodiment of a stator lamination, in accordance with the present disclosure.

FIG. 1 illustrates an embodiment of a stacked lamination stator 100 of an electric machine, in accordance with the present disclosure. FIG. 2 illustrates a plan view of an embodiment of a stator lamination 200, corresponding to the embodiment of FIG. 1. Lamination 200 is substantially annular in shape having an inner radius (r) and an outer radius (R). Lamination 200 may include a plurality of spaced teeth 201 extending radially inward from the radially outer back iron 203 defining slots 202 therebetween. The outer radius (R) generally defines the outer periphery of lamination 200 and constructed stator 100. The stator may be preferably constructed from low carbon, high silicon steel in accordance with known structural and magnetic properties. Lamination 200 may be preferably produced by a punching press operating on rolled steel sheet stock. Lamination 200 may include a plurality of peripherally outer protuberances or mounting ears 205 which are preferably symmetrically distributed about the periphery with equivalent angular spacing. However, alternative or non-symmetrical distributions about the periphery of the lamination and stator are envisioned. Each mounting ear 205 has a hole or aperture 207 formed therein. Aperture, as used herein, may include a slot which is not continuous to form a closed hole. "Substantially annular" as used herein means largely, but not wholly annular, wherein a lamination is primarily defined between the inner radius (r) and outer radius (R) but may include protrusions beyond the outer radius (R) (such as mounting ears 205) and material voids (such as slots 202 between teeth 201). Lamination 200 may vary in thickness in accordance with application; however, lamination thickness in any given stator construction is preferably the same. In one embodiment, nominal lamination 200 thicknesses between about 0.2 mm and 0.4 mm may be preferred.

A plurality of laminations 200 may be stacked to fabricate stator 100. In accordance with one embodiment, a stator stack 101 may include a first plurality of laminations 200. A bracket stack 103 may include a second plurality of laminations 200. The stator stack 101 may include a major fraction or majority of the total laminations 200 utilized in the stator 100. The bracket stack 103 may include a minor fraction or minority of the total laminations 200 utilized in the stator 100. Stator stack 101 may include a number of smaller sub-stacks 105 which allows for rotative reorientation of these sub-stacks to lessen the impact from material thickness variations and tolerance stack ups. Reorientation of sub-stacks may advantageously even out the anisotropic magnetic characteristics in rolled steel used in the lamination production. The bracket stack 103 may be any suitable thickness for bracket construction that will advantageously provide sufficient bracket flexure as described further herein. Stiffness of the bracket stack 103 may be tuned by increasing or decreasing the number of laminations 200. In one embodiment, the bracket stack 103 may be between about 1.0 mm and 4.0 mm, or between about 3 and 20 laminations 200 having thickness of between about 0.2 mm and 0.4 mm. All numeric values herein are assumed to be modified by the term "about", whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally.

The stator stack 101 laminations 200 may be stacked adjacently with one another with the mounting ear apertures 207 substantially aligned with one another to define a stator mounting boss 107. Similarly, the bracket stack 103 laminations 200 may be stacked adjacently with one another with the mounting ear apertures 207 substantially aligned with one another to define a bracket mounting tab 109. The stator stack 101 and bracket stack 103 may be stacked adjacently. Thinner bracket stacks 103 may beneficially provide flexure or deformation capacity of the mounting tabs 109 without deformation of the stator back iron. Each of the stator stack 101 and the bracket stack 103 may be welded to fix all respective laminations 200 in each stack, and welded to fix the stator stack 101 to the bracket stack 103.

Figure 3:
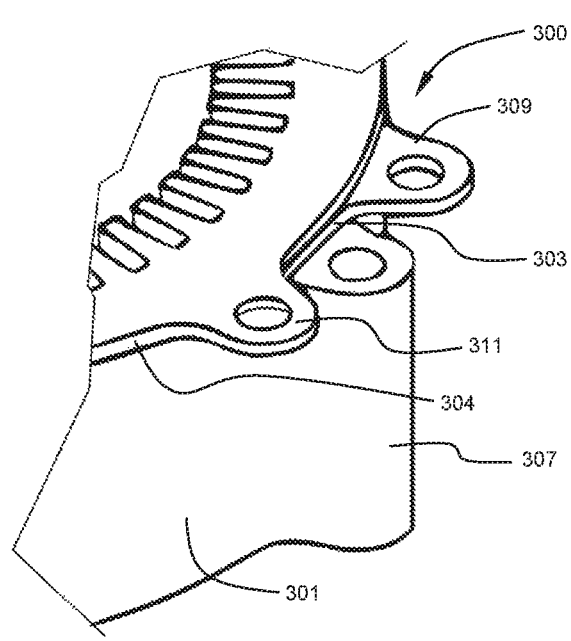
FIG. 3 illustrates a partial view of an embodiment of a stacked lamination stator of an electric machine, in accordance with the present disclosure.

FIG. 3 illustrates a partial view of an embodiment of a stacked lamination stator 300 of an electric machine, in accordance with the present disclosure. Stator 300 may be constructed utilizing the stator laminations 200 illustrated in FIG. 2 and previously described.

A plurality of laminations 200 may be stacked to fabricate stator 300. In accordance with one embodiment, a stator stack 301 may include a first plurality of laminations 200. A bracket stack 303 may include a second plurality of laminations 200. A bracket stack 304 may include a third plurality of laminations 200. The stator stack 301 may include a major fraction or majority of the total laminations 200 utilized in the stator 300. The bracket stacks 303, 304 may include a minor fraction or minority of the total laminations 200 utilized in the stator 300. Stator stack 301 may include a number of smaller sub-stacks in the same manner as described in relation to FIG. 1. The bracket stacks 303, 304 may be any suitable thickness for bracket construction that will advantageously provide sufficient bracket flexure as described further herein. In one embodiment, the bracket stack 103 may be between about 1.0 mm and 4.0 mm, or between about 3 and 20 laminations 200 having thickness of between about 0.2 mm and 0.4 mm.

The stator stack 301 laminations 200 may be stacked adjacently with one another with the mounting ear apertures 207 substantially aligned with one another to define a stator mounting boss 307. The bracket stack 303 laminations 200 may be stacked adjacently with one another with the mounting ear apertures 207 substantially aligned with one another to define a bracket mounting tab 309. Similarly, the bracket stack 304 laminations 200 may be stacked adjacently with one another with the mounting ear apertures 207 substantially aligned with one another to define a bracket mounting tab 311. The stator stack 301 and bracket stacks 303, 304 may be stacked adjacently as illustrated with the stator stack 301 beneath the bracket stacks 303, 304. Thinner bracket stacks 303, 304 may beneficially provide flexure or deformation capacity of the mounting tabs 309 without significant deformation of the stator back iron. Each of the stator stack 301, the bracket stack 303, and the bracket stack 304 may be welded to fix all respective laminations 200 in each stack, and welded to fix the stator stack 301, the bracket stack 303, and the bracket stack 304 together. The bracket mounting tabs 309, 311 may be angularly separated and on angularly opposite sides of the stator mounting boss 307.

Figure 4:
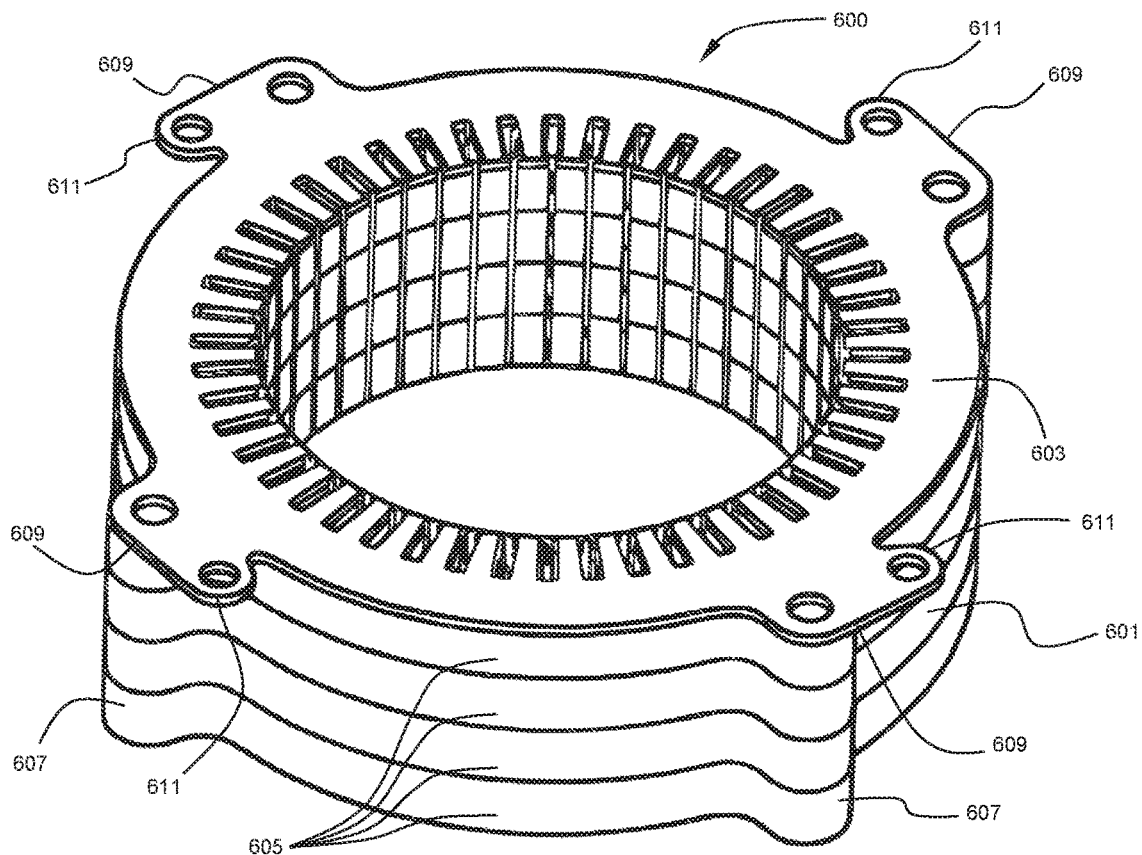
FIG. 4 illustrates an embodiment of a stacked lamination stator of an electric machine, in accordance with the present disclosure.
Figure 5:
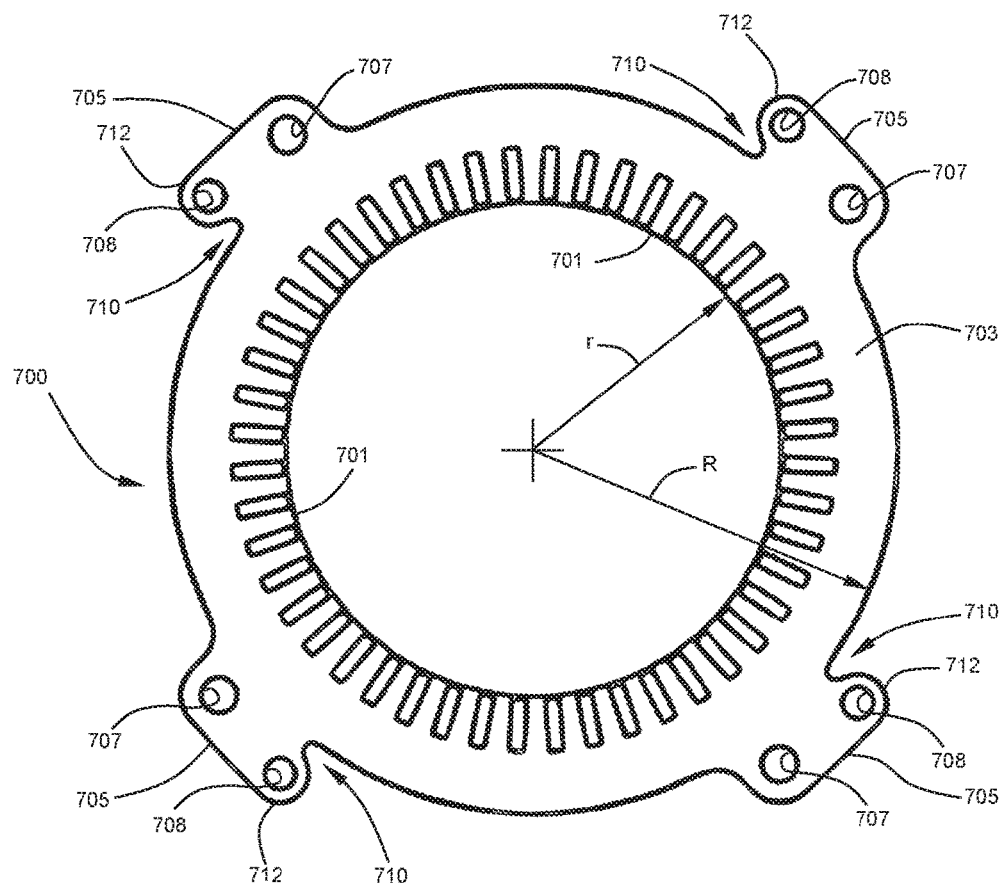
FIG. 5 illustrates a plan view of an embodiment of a stator lamination, in accordance with the present disclosure.

FIG. 4 illustrates an embodiment of a stacked lamination stator 600 of an electric machine, in accordance with the present disclosure. FIG. 2 and FIG. 5 illustrate plan views of embodiments of stator laminations 200 and 700, respectively, corresponding to the embodiment of FIG. 4. Laminations 200 and 700 are substantially annular in shape having respective inner radius (r) and outer radius (R). Laminations 200 and 700 include respective pluralities of teeth 201 and 701, respectively, extending radially inward from the radially outer back iron 203 and 703. The outer radius (R) generally defines the outer periphery of laminations 200 and 700 and constructed stator 600. The stator may be preferably constructed from low carbon, high silicon steel in accordance with known structural and magnetic properties. Laminations 200 and 700 may be preferably produced by a punching press operating on rolled steel sheet stock. Lamination 200 may include a plurality of peripherally outer protuberances or mounting ears 205 which are preferably symmetrically distributed about the periphery with equivalent angular spacing. However, alternative or non-symmetrical distributions about the periphery of the lamination and stator are envisioned. Each mounting ear 205 has a hole or aperture 207 formed therein. Lamination 700 may include a plurality of peripherally outer protuberances or mounting ears 705 which are preferably symmetrically distributed about the periphery with equivalent angular spacing. However, alternative or non-symmetrical distributions about the periphery of the lamination and stator are envisioned. Each mounting ear 705 has a pair of holes or apertures 707, 708 formed therein. Aperture, as used herein, may include a slot which is not continuous to form a closed hole. Each mounting ear 705 may include a side lobe 712 extending generally tangentially from aperture 708. Side lobe 712 defines aperture 708 and may include an undercut 710 to partially decouple the side lobe 712 from the back iron 703 allowing flexure without deforming the back iron 703. Lamination 700 may vary in thickness in accordance with application; however, lamination thickness in any given bracket construction is preferably the same. In one embodiment, nominal lamination 700 thicknesses between about 0.2 mm and 0.4 mm may be preferred.

A plurality of laminations 200 and 700 may be stacked to fabricate stator 600. In accordance with one embodiment, a stator stack 601 may include a first plurality of laminations 200. A bracket stack 603 may include a second plurality of laminations 700. The stator stack 601 may include a major fraction or majority of the total laminations utilized in the stator 600. The bracket stack 603 may include a minor fraction or minority of the total laminations utilized in the stator 600. Stator stack 601 may include a number of smaller sub-stacks 605 which allows for rotative reorientation of these sub-stacks to lessen the impact from material thickness variations and tolerance stack ups. Reorientation of sub-stacks may advantageously even out the anisotropic magnetic characteristics in rolled steel used in the lamination production. The bracket stack 603 may be any suitable thickness for bracket construction that will advantageously provide sufficient bracket flexure as described further herein. Stiffness of the bracket stack 603 may be tuned by increasing or decreasing the number of laminations 700. In one embodiment, the bracket stack 603 may be between about 1.0 mm and 4.0 mm, or between about 3 and 20 laminations 200 having thickness of between about 0.2 mm and 0.4 mm.

The stator stack 601 laminations 200 may be stacked adjacently with one another with the mounting ear apertures 207 substantially aligned with one another to define a stator mounting boss 607. Similarly, the bracket stack 603 laminations 700 may be stacked adjacently with one another with the mounting ear apertures 707, 708 substantially aligned with one another to define a bracket mounting tab 609. The stator stack 601 and bracket stack 603 may be stacked adjacently with the apertures 707 substantially aligned with the stator mounting boss 607 and apertures 708 cantilevered generally tangentially therefrom. Thinner bracket stacks 603 may beneficially provide flexure or deformation capacity of the mounting tabs 609 in a cantilevered region 611 without deformation of the stator back iron. Each of the stator stack 601 and the bracket stack 603 may be welded to fix all respective laminations 200 and 700 in each stack, and welded to fix the stator stack 601 to the bracket stack 603.

Figure 6:
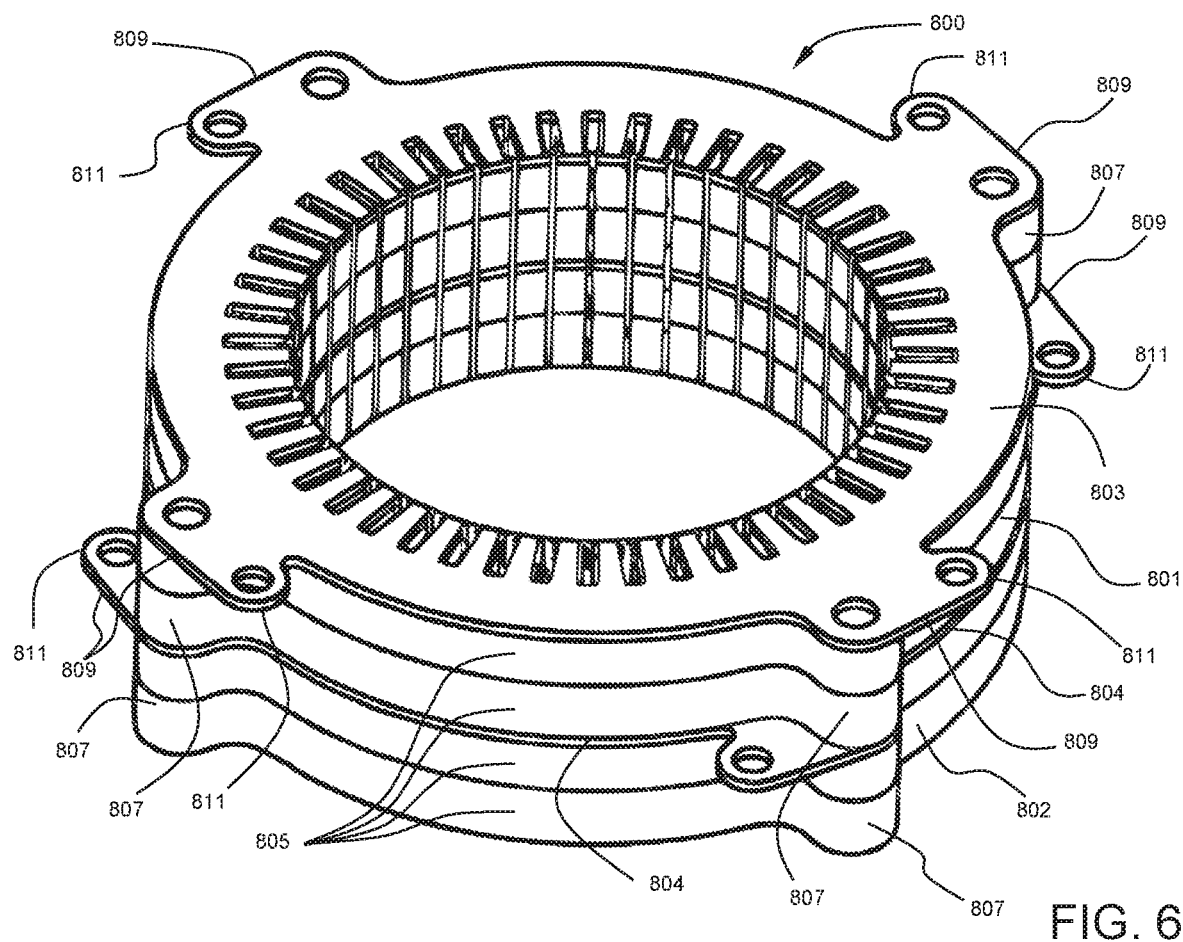
FIG. 6 illustrates an embodiment of a stacked lamination stator of an electric machine, in accordance with the present disclosure.

FIG. 6 illustrates an embodiment of a stacked lamination stator 800 of an electric machine, in accordance with the present disclosure. Stator 800 may be constructed utilizing the stator laminations 200 and 700 illustrated in FIG. 2 and FIG. 5 previously described.

A plurality of laminations 200 and 700 may be stacked to fabricate stator 800 substantially as described herein with respect to FIG. 2, FIG. 4 and FIG. 5. In accordance with one embodiment, a stator stack 801 may include a first plurality of laminations 200. A bracket stack 803 may include a second plurality of laminations 700. A bracket stack 804 may include a third plurality of laminations 700. A fourth stator stack 802 may include a fourth plurality of laminations 200. The stator stacks 801, 802 may include a major fraction or majority of the total laminations utilized in the stator 800. The bracket stacks 803, 804 may include a minor fraction or minority of the total laminations utilized in the stator 800. Stator stacks 801, 802 may include a number of smaller sub-stacks 805 in the same manner as described in relation to FIG. 4. Stator stacks 801, 802 laminations 200 may be stacked adjacently with one another with the mounting ear apertures 207 substantially aligned with one another to define stator mounting bosses 807. The bracket stacks 803, 804 may include respective mounting tabs 809 including cantilevered regions 811. The bracket stacks 803, 804 may be any suitable thickness for bracket construction that will advantageously provide sufficient bracket flexure as described further herein. In one embodiment, the second and third stator stacks 803, 804 may be between about 1.0 mm and 4.0 mm, or between about 3 and 20 laminations 700 having thickness of between about 0.2 mm and 0.4 mm.

The stator 800 of FIG. 6 is distinguished over the stator 600 of FIG. 4 by the bracket stack 804 being located intermediate within the bracket stacks 801, 802. Additionally, the bracket stack 804 is characterized by its respective cantilevered regions 811 being arranged on the angularly opposite side of the stator mounting bosses 807 from the respective cantilevered regions 811 of the bracket stack 803. It should be appreciated that the bracket stacks 803, 804 may be identical with the exception of their respective orientations within the stator stacks 801,802.

Figure 7A:
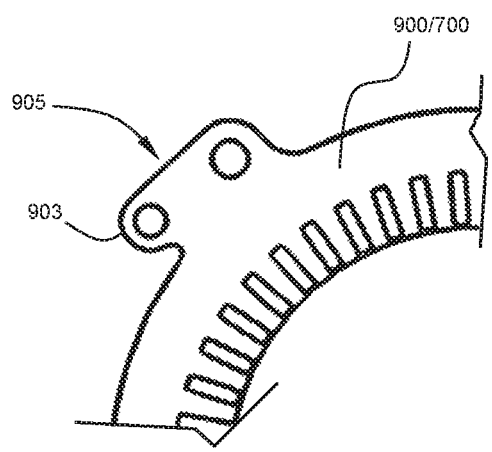
FIGS. 7A-7C illustrate partial plan views of alternate embodiments and manufacturing steps of stator laminations, in accordance with the present disclosure.
Figure 7B:
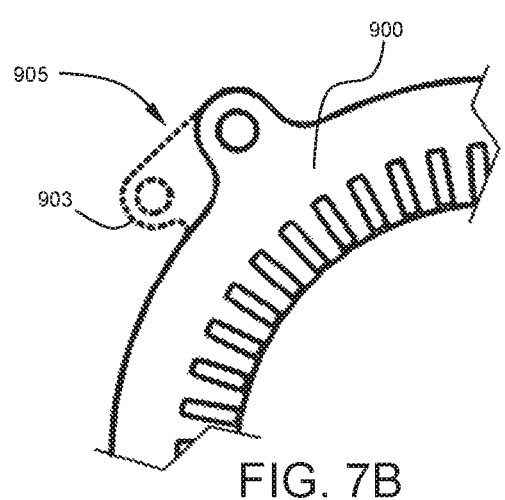
Figure 7C:
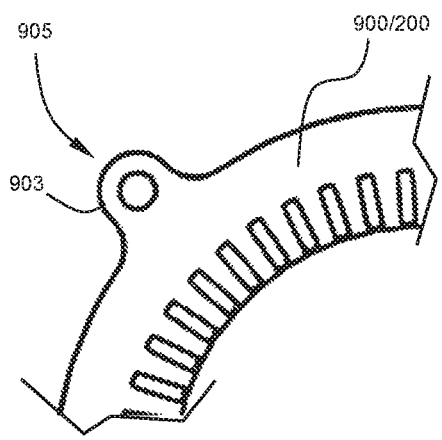

Stator laminations 200 and 700 may be manufactured on the same punch press or equivalent tooling utilizing a progressive die. For example, with reference to FIGS. 7A-7C, a first strike or set of strikes at a first station or set of stations may punch out the larger protuberance or mounting ear 905 including the cantilevered portion 903, the undercut and both apertures of lamination 900 (FIG. 7A). The workpiece may be completed at this point with respect to the mounting ear 905 leaving the double apertured mounting ear of lamination 700. The workpiece may be progressed to a second station or set of stations to punch out the cantilevered portion 903 (broken line, FIG. 7B) leaving only the single apertured mounting ear 905 of lamination 200 (FIG. 7C). Similarly, a single strike may produce either the single or double apertured mounting ears in a punch press capable of selectively actuating punch tooling corresponding to the cantilevered portion 903.

Figure 8:
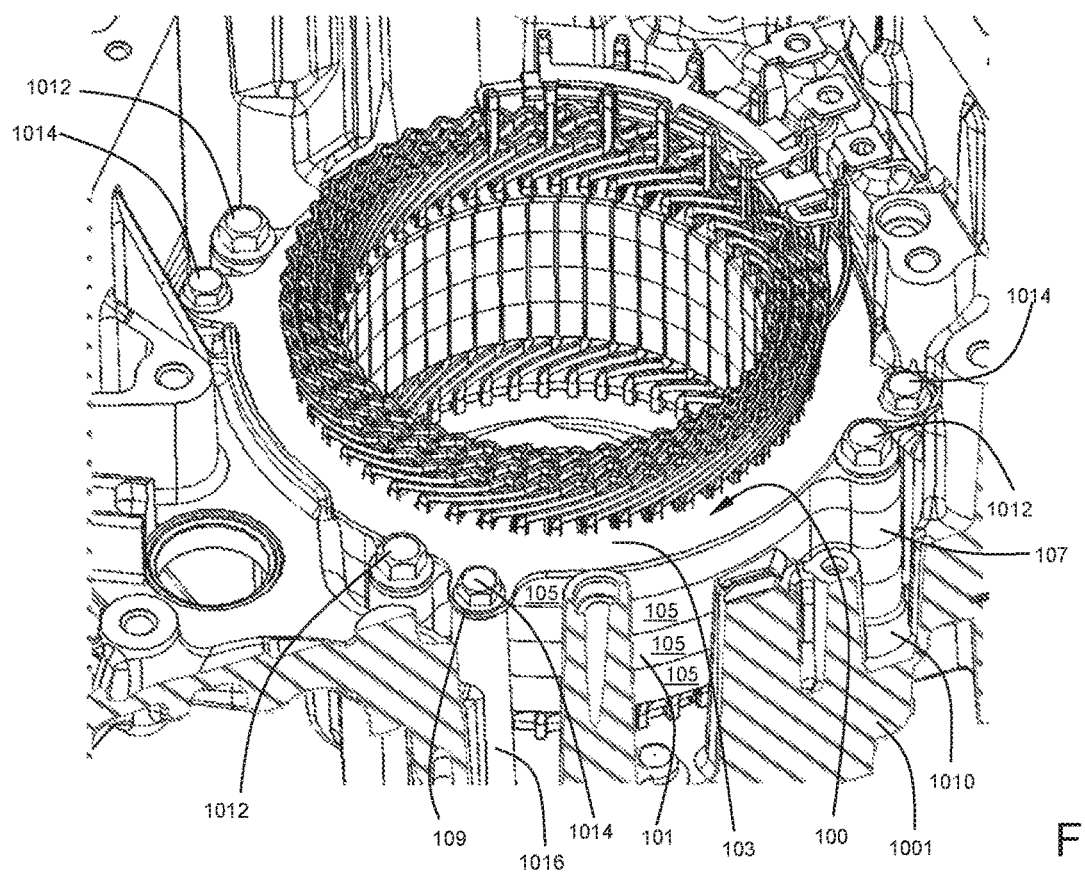
FIG. 8 illustrates an embodiment of a stacked lamination stator secured to a machine housing of an electric machine, in accordance with the present disclosure.

FIG. 8 illustrates an embodiment of a stacked lamination stator 100 of FIG. 1 secured to an electric machine housing 1001. Machine housing 1001 may include mounting provisions for the stator 100 including, for example, stand-offs, stanchions, bosses and the like. Machine housing 1001 may include short stanchions 1010 for interfacing directly with the bottom of the stator mounting bosses 107. The short stanchions 1010 may provide tightly toleranced locating surfaces for the bottom of the stator 100. Alternate surfaces may provide stator location to the housing 1001. The stanchions 1010 may include interior threads for receiving a bolt 1012 through the stator mounting bosses 107. In addition to alternatives to stanchions providing locating surfaces for the bottom of the stator, alternatives to stanchions may also provide interior threads for bolt 1012 reception. Bolts 1012 may be torqued to secure the stator to the machine housing with the stator bottom definitively located to the housing 1001 at the short stanchions 1010 or alternative location surfaces. The major fraction of the total laminations making up the stator stack 101 provides for relative inflexibility of the stator mounting bosses 107 and the primary mechanical coupling of the stator 100 to the housing 1001. The machine housing 1001 may include long stanchions or risers 1016 or alternative surfaces for attaching the bracket mounting tab 109 to the housing 1001. In differentiation from the short stanchions or alternative locating surfaces for the bottom of the stator, the long stanchions 1016 or alternative surfaces for securing the bracket mounting tabs 109 to the housing 1001 may provide an interference free surface. In other words, as the bottom of the stator 100 is located to the short stanchions 1010 or alternative location surfaces and the stator 100 is secured to the housing 1001 with bolts 1012, the bracket mounting tabs 109 preferably are not in contact with the long stanchions 1016 or alternative surfaces for securing the bracket mounting tabs 109 to the housing 1001. Initial freedom from interference between short stanchions or alternatives and bracket mounting tabs 109 is described in further detail herein with additional reference to FIGS. 10A-10C. The stanchions 1016 may include interior threads for receiving bolts 1014 through the mounting tabs 109. In addition to alternatives to stanchions providing attachment surfaces for the mounting tabs 109, alternatives to stanchions may also provide interior threads for bolts 1014 reception. Bolts 1014 may be torqued to attach the stator top at the mounting tabs 109 to the machine housing thereby stiffening the stator against torsional displacements at the top, cantilevered end, primarily due to reactive forces during machine operation. Advantageously, the minor fraction of the total laminations making up the bracket stack 103 provides for relative flexibility of the mounting tabs 109 enabling secure mechanical coupling of the of the bracket stack 103 to the housing 1001 without undesirable deformation of the bracket stack 103. Advantageously, the relative flexibility of the mounting tabs 109 enables effective interference free assembly of the stator 100 to the locating surfaces even in the event of actual interference of the mounting tabs 109 with attachment surfaces. The designed ability of the mounting tabs 109 to deform without undesirable deformation of the bracket stack 103 is advantageous. It is therefore appreciated that the mounting tabs 109 enable two plane attachment of the stator 100 to the housing with single plane critical tolerancing of location surfaces of the housing 1001 at the bottom of the stator 100.

Figure 9:
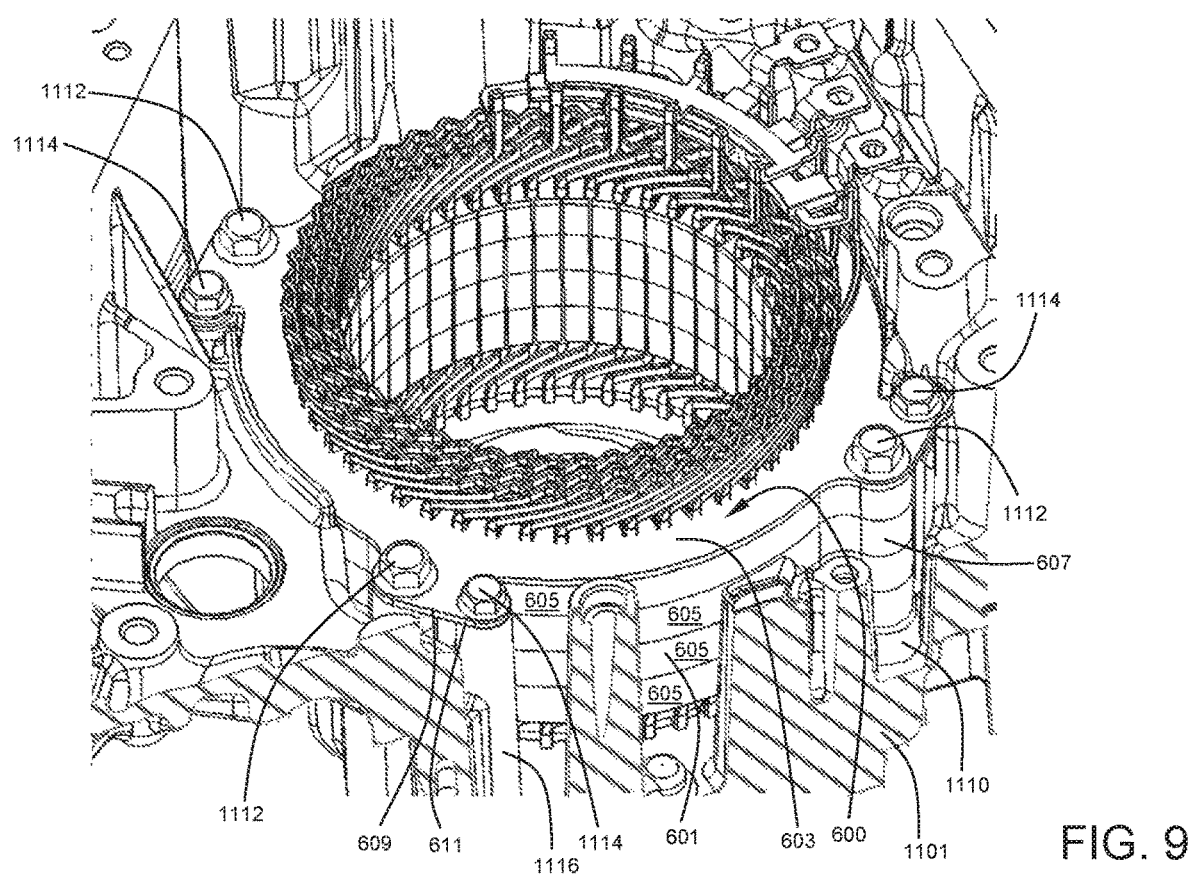
FIG. 9 illustrates an embodiment of a stacked lamination stator secured to a machine housing of an electric machine, in accordance with the present disclosure.

FIG. 9 illustrates an embodiment of a stacked lamination stator 600 of FIG. 4 secured to an electric machine housing 1101. Machine housing 1101 may include mounting provisions for the stator 600 including, for example, stand-offs, stanchions, bosses and the like. Machine housing 1101 may include short stanchions 1110 for interfacing directly with the bottom of the stator mounting bosses 607. The short stanchions 1110 may provide tightly toleranced locating surfaces for the bottom of the stator 600. Alternate surfaces may provide stator location to the housing 1101. The stanchions 1110 may include interior threads for receiving bolts 1112 through the stator mounting bosses 607. In addition to alternatives to stanchions providing locating surfaces for the bottom of the stator, alternatives to stanchions may also provide interior threads for bolt 1112 reception. Bolts 1112 may be torqued to secure the stator to the machine housing with the stator bottom definitively located to the housing 1101 at the short stanchions 1110 or alternative location surfaces. It is appreciated that the major fraction of the total laminations making up the stator stack 601 provides for relative inflexibility of the stator mounting boss 607 and the primary mechanical coupling of the stator 600 to the housing 1101. The machine housing 1101 may include long stanchions or risers 1116 or alternative surfaces for attaching the bottoms of the cantilevered regions 611 of the mounting tabs 609 to the housing 1101. In differentiation from the short stanchions or alternative locating surfaces for the bottom of the stator, the long stanchions 1116 or alternative surfaces for securing the bottoms of the cantilevered regions 611 of the mounting tabs 609 to the housing 1101 may provide an interference free surface. In other words, as the bottom of the stator 600 is located to the short stanchions 1110 or alternative location surfaces and the stator 600 is secured to the housing 1101 with bolts 1112, the cantilevered regions 611 of the mounting tabs 609 preferably are not in contact with the long stanchions 1116 or alternative surfaces for securing the cantilevered regions 611 of the mounting tabs 609 to the housing 1101. Initial freedom from interference between short stanchions or alternatives and cantilevered regions 611 of the mounting tabs 609 is described in further detail herein with additional reference to FIGS. 10A-10C. The stanchions 1116 may include interior threads for receiving bolts 1114 through the cantilevered regions 611 of the mounting tabs 609. In addition to alternatives to stanchions providing attachment surfaces for the cantilevered regions 611 of the mounting tabs 609, alternatives to stanchions may also provide interior threads for bolts 1114 reception. Bolts 1114 may be torqued to attach the stator top at the cantilevered regions 611 of the mounting tabs 609 to the machine housing 1101 thereby stiffening the stator against torsional displacements at the top, cantilevered end, primarily due to reactive forces during machine operation. Advantageously, the minor fraction of the total laminations making up the bracket stack 603 provides for relative flexibility of the cantilevered regions 611 of the mounting tabs 609 enabling secure mechanical coupling of the of the bracket stack 603 to the housing 1101 without undesirable deformation of the bracket stack 603. Advantageously, the relative flexibility of the cantilevered regions 611 of the mounting tabs 609 enable effective interference free assembly of the stator 600 to the locating surfaces even in the event of actual interference of the cantilevered regions 611 of the mounting tabs 609 with attachment surfaces. The designed ability of the cantilevered regions 611 of the mounting tabs 609 to deform without undesirable deformation of the bracket stack 603 is advantageous. It is therefore appreciated that the cantilevered regions 611 of the mounting tabs 609 enable two plane attachment of the stator 600 to the housing with single plane critical tolerancing of location surfaces of the housing 1101 at the bottom of the stator 600.

Figure 10A:
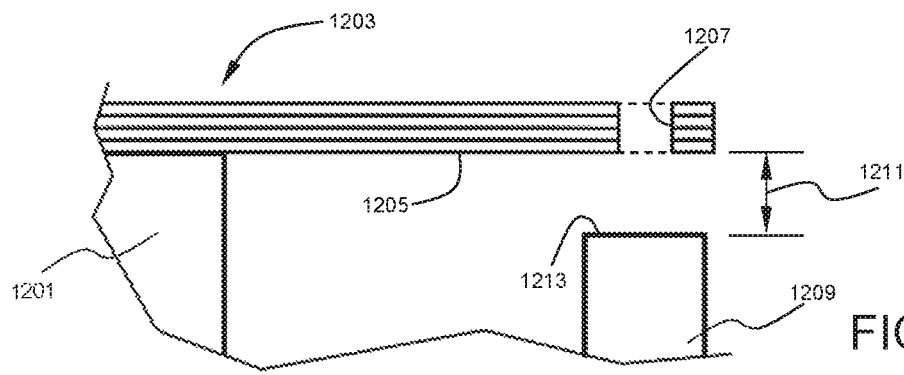
FIGS. 10A-10C illustrate a progression of assembly of a stator to a machine housing, in accordance with the present disclosure.
Figure 10B:
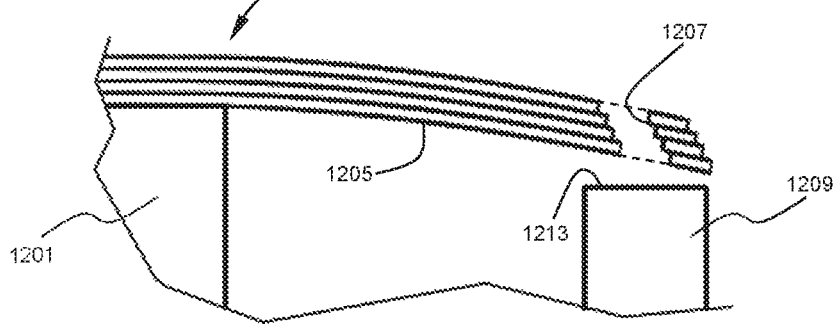
Figure 10C:
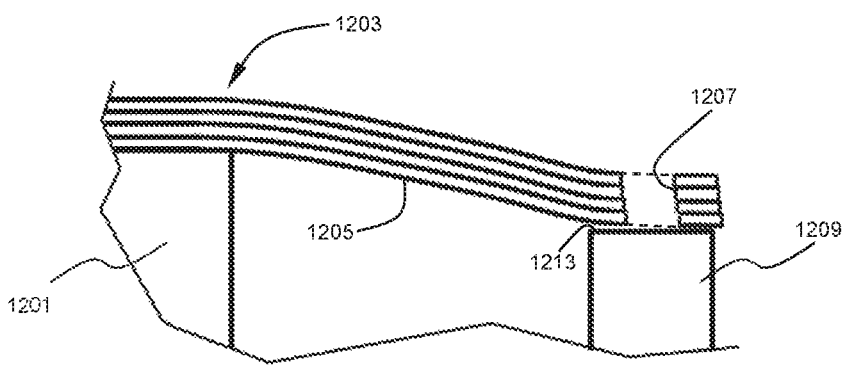

FIGS. 10A-10C illustrate a progression of assembly of a stator to a machine housing in accordance with the present disclosure. The illustration is not to scale and exaggerates dimensions for proper appreciation of certain advantageous aspects in accordance with the present disclosure. In all FIGS. 10A-10C, like reference numbers refer to the same features between the various views. A stator stack 1201 may include a first plurality of stacked laminations as described herein. Stacked adjacent to the stator stack 1201 is a bracket stack 1203 including mounting tab 1205 defining aperture 1207. The bottom of the stator stack 1201 (not shown) is fixed to a locating surface (not shown) as described herein with respect to FIGS. 8 and 9. To ensure accurate location of the stator, it is desirable that other stator features, for example bracket stack 1203, remain free of interference with other features in the machine housing. Thus, stanchion 1209 or alternative may provide a surface 1213 for securing the mounting tab 1205 that is toleranced to provide an assembly gap or clearance 1211, for example, nominally 1.0 mm. A bolt may be inserted through aperture 1207 and received into stanchion 1209 as described herein. As the bolt engages with the mounting tab and deforms it (FIGS. 10B and 10C), the individual laminations used to construct the bracket stack 1203 and mounting tab 1205 are able to slip, thus relieving the stresses of the bend thereby reducing any stress transfer to the bracket stack 1203. Advantageously, interference during assembly of the mounting tab 1205 with stanchion 1209 may likewise deflect the mounting tab oppositely, which deflection may also be accommodated in a similar manner wherein the individual laminations used to construct the bracket stack 1203 and mounting tab 1205 are able to slip, thus relieving the stresses of the bend thereby reducing any stress transfer to the bracket stack 1203.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An electric machine, comprising:
a substantially annular stator stack comprising a plurality of laminations, each lamination comprising a peripherally outer protuberance defining an aperture, the laminations in stacked adjacency with one another, a major fraction of adjacent laminations having respective apertures substantially aligned with one another to define a stator stack having a stator mounting boss, and a first minor fraction of adjacent laminations having respective apertures substantially aligned with one another to define a first bracket stack having a first bracket mounting tab, the first bracket stack being stacked at one end of the stator stack with the stator mounting boss and the first bracket mounting tab being angularly displaced from each other, the first bracket stack comprising a total thickness of between about 1.0 mm and about 4.0 mm and between 3 and 20 laminations.

2. The electric machine of claim 1, wherein all laminations are substantially identical.

3. The electric machine of claim 1, comprising laminations between about 0.2 mm and about 0.4 mm.

4. The electric machine of claim 1, wherein the major fraction of adjacent laminations is welded to the first minor fraction of adjacent laminations.

5. The electric machine of claim 1, further comprising:
a machine housing;
a first threaded fastener passing through the stator mounting boss for fastening the major fraction of adjacent laminations to the machine housing; and
a second threaded fastener passing through the first bracket mounting tab for fastening the first minor fraction of adjacent laminations to the machine housing.

6. The electric machine of claim 1, further comprising:
a second minor fraction of adjacent laminations being stacked intermediate within the stator stack and having apertures substantially aligned with one another to define a second bracket stack having a second bracket mounting tab, the stator mounting boss and second bracket mounting tab being angularly displaced from each other with the first and second bracket mounting tabs being located on angularly opposite sides of the stator mounting boss.

7. An electric machine, comprising:
a machine housing;
a substantially annular first stator stack comprising a first plurality of first laminations, each first lamination comprising a peripherally outer first mounting ear defining a first aperture, the first laminations in stacked adjacency with one another with the first apertures substantially aligned with one another to define a stator mounting boss;
a substantially annular second stator stack comprising a second plurality of second laminations, each second lamination comprising a peripherally outer second mounting ear defining a second aperture, the second laminations in stacked adjacency with one another with the second apertures substantially aligned with one another to define a first bracket mounting tab, the second stator stack comprising a total thickness of between about 1.0 mm and about 4.0 mm and between 3 and 20 laminations;
the second stator stack in stacked adjacency with the first stator stack with the stator mounting boss and the first bracket mounting tab angularly separated;
a first fastener passing through the stator mounting boss for fastening the first stator stack to the machine housing; and
a second fastener passing through the first bracket mounting tab for fastening the second stator stack to the machine housing.

8. The electric machine of claim 7, wherein the first laminations and second laminations are substantially identical.

9. The electric machine of claim 7, wherein the second mounting ear of the second laminations defines a third aperture, the second laminations in stacked adjacency with one another with the third apertures substantially aligned with one another, the second stator stack in stacked adjacency with the first stator stack with the third apertures substantially aligned with the first apertures.

10. The electric machine of claim 9, further comprising a substantially annular third stator stack comprising a third plurality of the second laminations in stacked adjacency with one another with the second apertures substantially aligned with one another to define a second bracket mounting tab, the third stator stack in stacked adjacency with the second stator stack opposite the first stator stack with the third apertures of the third stator stack substantially aligned with the first apertures defining the first stack mounting boss, and with the second apertures of the second and third stator stacks on angularly opposite sides of the stator mounting boss.

11. The electric machine of claim 9, further comprising a substantially annular third stator stack comprising a third plurality of the second laminations in stacked adjacency with one another with the second apertures substantially aligned with one another to define a second bracket mounting tab, the third stator stack being stacked intermediate within the first stator stack with the third apertures of the third stator stack substantially aligned with the first apertures defining the first stack mounting boss, and with the second apertures of the second and third stator stacks on angularly opposite sides of the stator mounting boss.

12. The electric machine of claim 7, further comprising a substantially annular third stator stack comprising a third plurality of the second laminations in stacked adjacency with one another with the second apertures substantially aligned with one another to define a second bracket mounting tab, the third stator stack in stacked adjacency with the second stator stack opposite the first stator stack with the second apertures of the second and third stator stacks on angularly opposite sides of the stator mounting boss.

13. The electric machine of claim 7, wherein all laminations are between about 0.2 mm and about 0.4 mm.

14. The electric machine of claim 8, wherein the first stator stack is welded to the second stator stack.

15. A method for constructing an electric machine, comprising:
  punching a plurality of laminations, each lamination comprising a peripherally outer protuberance defining a mounting aperture;
  stacking a first fraction of the plurality of laminations such that respective mounting apertures are substantially aligned with one another to define a stator mounting boss;
  stacking a second fraction of the plurality of laminations such that respective mounting apertures are substantially aligned with one another to define a bracket mounting tab, the second fraction of laminations comprising a total thickness of between about 1.0 mm and about 4.0 mm and between 3 and 20 laminations;
  stacking the second fraction at a top end of the first fraction to define a stator stack with the stator mounting boss and the bracket mounting tab being angularly displaced from each other;
  locating a bottom end of the stator stack to a locating surface of a machine housing and securing the stator stack to the machine housing with a fastener through the stator mounting boss; and
  securing the stator stack to the machine housing with a fastener through the bracket mounting tab.

16. The method of claim 15, comprising:
  welding the first fraction of stacked laminations to the second fraction of stacked laminations.

17. The method of claim 15, wherein punching a plurality of laminations comprises punching identical laminations for the first and second fractions.

18. The method of claim 15, wherein punching a plurality of laminations comprises punching a first lamination comprising a mounting ear with a single aperture for the first fraction of laminations, and punching a second lamination comprising a mounting ear with a pair of apertures for the second fraction of laminations, wherein punching the first and second laminations is accomplished with progressive station tooling.

19. The method of claim 15, wherein punching a plurality of laminations comprises punching a first lamination comprising a mounting ear with a single aperture for the first fraction of laminations, and punching a second lamination comprising a mounting ear with a pair of apertures for the second fraction of laminations, wherein punching the first and second laminations is accomplished with selectively actuated punch tooling.

20. The electric machine of claim 1, wherein the first bracket stack comprising a total thickness of between about 1.0 mm and about 4.0 mm and between 3 and 20 laminations provides deformation capacity of the first bracket mounting tab without deformation of the first bracket stack.

\* \* \* \* \*